United States Patent [19]
Wehner

[11] Patent Number: 5,558,379
[45] Date of Patent: Sep. 24, 1996

[54] IMPLEMENT HAVING AN ERGONOMIC STEP

[75] Inventor: Herbert U. Wehner, Columbus, Ohio

[73] Assignee: UnionTools, Columbus, Ohio

[21] Appl. No.: 288,706

[22] Filed: Aug. 12, 1994

[51] Int. Cl.$^6$ ........................................................ A01B 1/02
[52] U.S. Cl. .............................................. 294/60; 294/49
[58] Field of Search ........................ 294/49, 50, 50.5–50.7, 294/51, 53.5, 54.5, 55.5, 56, 57, 59, 60; 7/114–116; 76/113; 172/371, 378, 380; 254/131.5, 132; D8/10

[56] References Cited

U.S. PATENT DOCUMENTS

| | | | |
|---|---|---|---|
| 1,278,680 | 9/1918 | Klaffert | 294/50.6 X |
| 1,519,892 | 12/1924 | Webster | 294/57 |
| 1,564,720 | 12/1925 | Surbaugh | 294/49 |
| 1,743,250 | 1/1930 | Surbaugh | 294/60 |
| 2,704,036 | 3/1955 | Briggs | 294/49 X |
| 2,750,223 | 6/1956 | Runkle | 294/49 |
| 3,697,110 | 10/1972 | Portz et al. | 294/57 |
| 4,396,214 | 8/1983 | Lesche | 294/49 |
| 4,451,073 | 5/1984 | Carmien | 294/57 |
| 4,570,988 | 2/1986 | Carmien | 294/57 |
| 4,639,029 | 1/1987 | Kolonia | 294/57 |
| 5,085,478 | 2/1992 | Seifert et al. | 294/60 |

FOREIGN PATENT DOCUMENTS

| | | | |
|---|---|---|---|
| 642093 | 8/1928 | France | 294/49 |
| 310931 | 9/1933 | Italy | 294/49 |
| 488317 | 7/1938 | United Kingdom | 294/49 |

OTHER PUBLICATIONS

"Fiberglass Handle Tools—Designed to Bury the competition," UnionTools Catalog, No date.
"Classic Plus Gard 'n' Grip Rhino Fiberglass," True Temper Catalog bearing 1992 copyright on selected pages.
"Power Tool™—The Tools of the Future—Now!, Men At Work," Structron Corporation 1995 Product Catalog.
"Anatomy of the World's Best Shovel," Structron Corporation Brochure bearing date Aug. 15, 1991.
"Complete Guide to Shovels—Ames," Ames catalog bearing date Sep. 1992 on last page.
"Dynamic . . . Innovative . . . Responsive That's What Makes NUPLA Better Than The 'Stone Age' Competition!", NUPLA catalog bearing 1988 copyright.

Primary Examiner—Johnny D. Cherry
Attorney, Agent, or Firm—Finnegan, Henderson, Farabow, Garrett and Dunner, L.L.P.

[57] ABSTRACT

An implement for penetrating soil or similar substances. The implement includes a handle having a gripping portion, a socket having a receiving portion, a work engaging portion, and a step having a foot engaging surface to which the user applies force to drive the work engaging portion into the soil. The foot engaging surface of the step is aligned with the natural orientation of the user's foot by positioning the centerline of the gripping portion or the receiving portion substantially normal to the foot engaging surface. Alternatively, where the implement has steps with foot engaging surfaces lying in first and second planes, the centerline of the gripping portion or receiving portion is substantially perpendicular to a line formed by the intersection of the first and second planes.

12 Claims, 5 Drawing Sheets

FIG. 2
FIG. 3
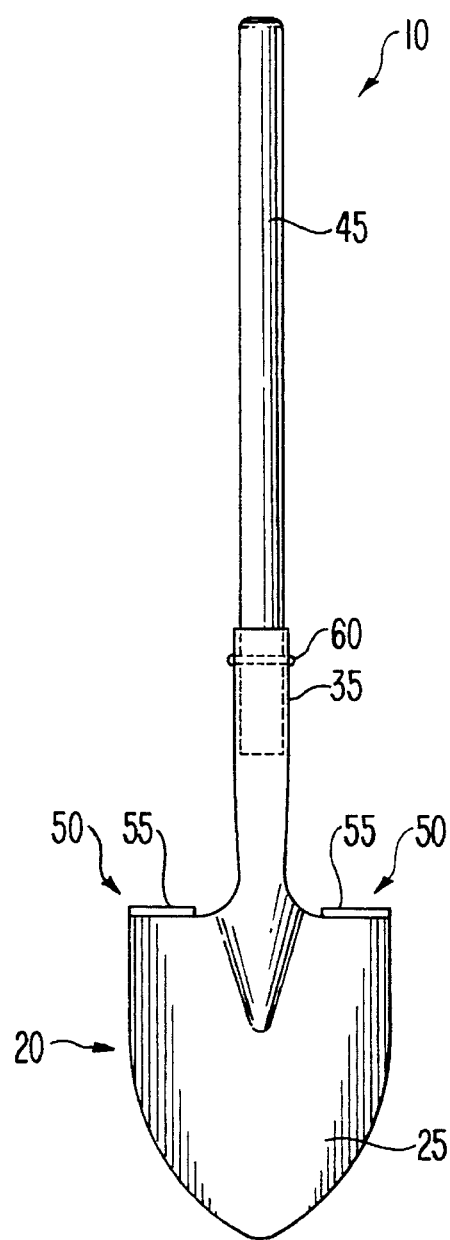
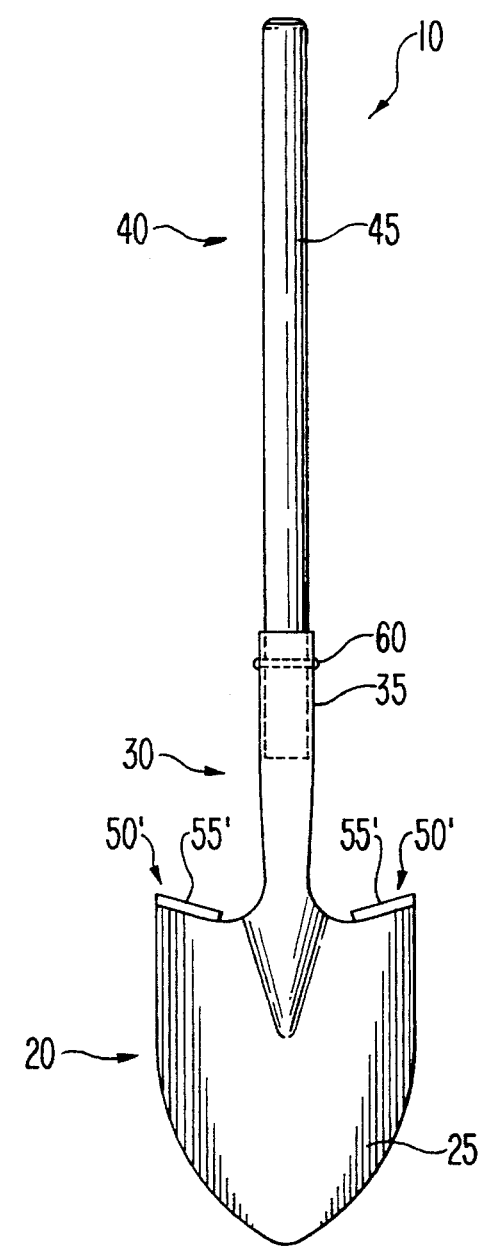

5,558,379

IMPLEMENT HAVING AN ERGONOMIC STEP

BACKGROUND OF THE INVENTION

1. Field of the Invention

The present invention relates to implements. More particularly, the present invention relates to shovels having ergonomic steps.

2. Description of the Related Art

Implements for penetrating and carrying soil or similar substances, such as shovels, typically include a work engaging portion, a formed step, and a handle. While holding the handle, the user of the implement applies force to the step with his or her foot to cause the work engaging portion to penetrate the soil. The user then lifts the implement to carry the soil to another location.

Conventional implements do not foster complete contact between the step and the user's foot. In a prior art implement shown in FIG. 6, an angle of approximately 75° exists between the centerline of the handle and the step. However, an angle of approximately 90° typically exists between the centerline of the handle and the bottom of the user's foot, when in its natural orientation. Thus, the user's foot, when in its natural orientation, will not fully engage the step.

Users of conventional implements can experience discomfort because of the orientation of the step. For example, the user's foot, when in its natural orientation, only contacts an edge of the step. That edge contact can cause discomfort to users wearing only light footwear or none at all. Further, the user must adjust his or her foot into an unnatural orientation during use to fully engage the step. The user may experience discomfort caused by the repeated application of force to the step with his or her foot in an unnatural orientation.

A user's foot may slip off a conventional implement because of the orientation of the step. The user's foot will not fully engage the step if the user maintains his or her foot in its preferred natural orientation. That lack of full engagement increases the probability that the user's foot will slip off the step when applying force to the step.

SUMMARY OF THE INVENTION

An object of the invention is to provide an implement that is comfortable for its user.

Another object of the invention is to provide an implement that decreases the probability that the user's foot will slip off the step during use.

A further object of the invention is to provide an implement having a step aligned with the natural orientation of the user's foot.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises an implement having a handle with a gripping portion, a work engaging portion having a curved section, a socket having a receiving portion, and a step having a substantially flat, foot engaging surface lying in a plane, wherein the centerline of the gripping portion or receiving portion is substantially normal to the plane.

Alternatively, the implement of the present invention comprises a handle with a gripping portion, a work engaging portion having a curved section, a socket having a receiving portion, a first step having a substantially flat, foot engaging surface lying in a first plane, and a second step having a substantially flat, foot engaging surface lying in a second plane, wherein the centerline of the gripping portion or receiving portion is substantially perpendicular to a line formed by the intersection of the first plane and the second plane.

The implement of the present invention provides a step aligned with the natural orientation of the user's foot by positioning the step relative to the gripping portion or receiving portion as described above. Accordingly, the apparatus of the present invention increases the comfort of the user and decreases the probability that the user's foot will slip off the step.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and, together with the description, serve to explain the principles of the invention.

BRIEF DESCRIPTION OF THE DRAWINGS

FIG. 2 is a front view of the implement of FIG. 1.

FIG. 3 is a front view of an alternate embodiment of the present invention.

DESCRIPTION OF THE PREFERRED EMBODIMENTS

Figure 1:
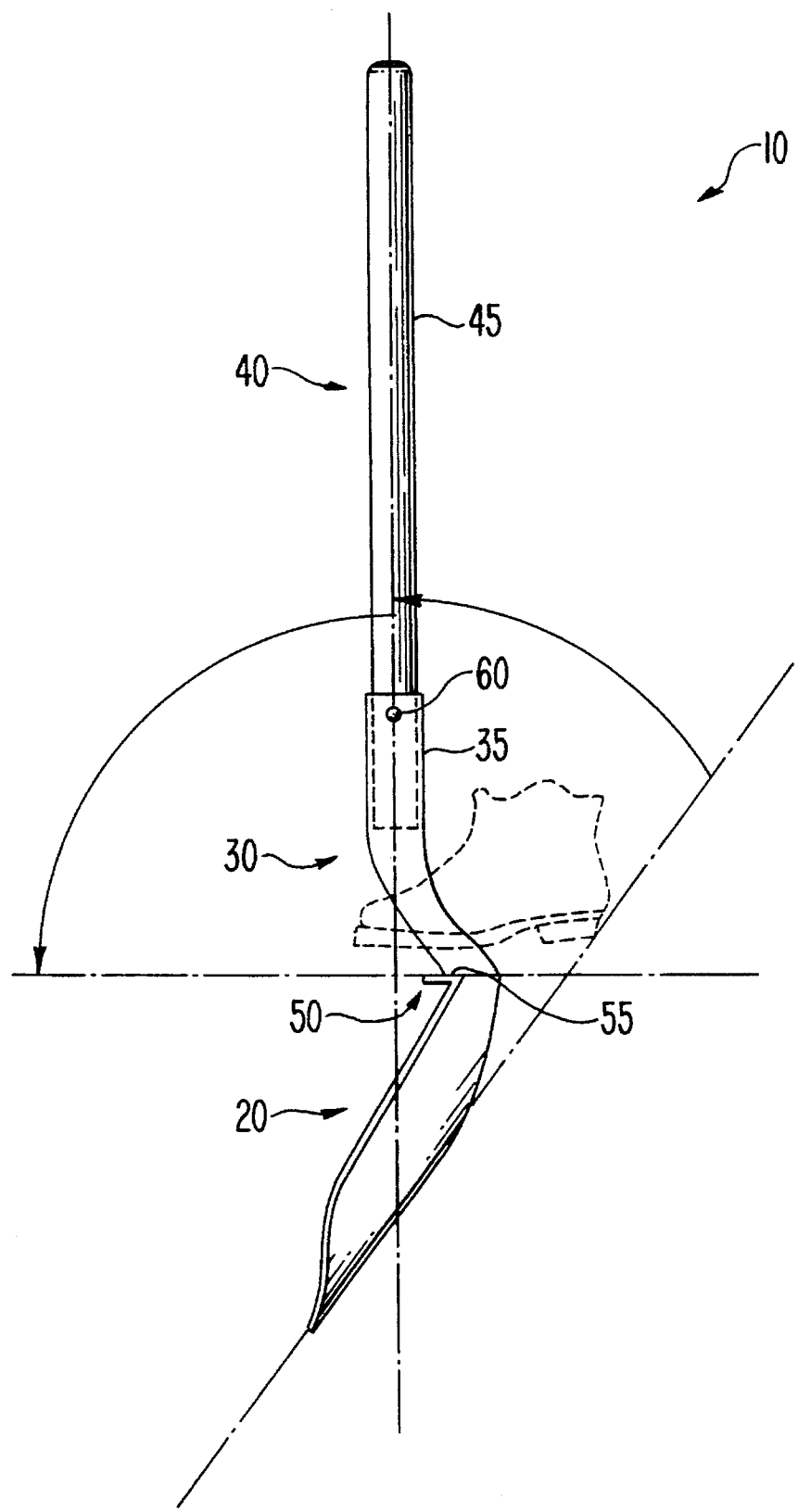
FIG. 1 is a side view of the preferred embodiment of the present invention.

Reference will now be made in detail to the presently preferred embodiments of the invention, examples of which are illustrated in the accompanying drawings. Wherever possible, the same reference numbers will be used throughout the drawings to refer to the same or like parts.

An implement in accordance with the present invention includes a work engaging portion, handle, and step. The implement of the present invention can be, for example, a shovel, which is preferred because its configuration and usage cause the invention to be particularly advantageous.

As embodied herein, the implement includes a work engaging portion 20 for penetrating soil or similar substances and carrying the soil on its carrying surface 25. The work engaging portion 20 can be any material and any configuration that enables it to penetrate and carry soil or similar substances. In the preferred embodiment, the work engaging portion 20 is a round-tipped shovel blade formed from sheet metal, has a thickness of fifty thousandths (0.050) to eighty thousandths (0.080) of an inch, and has a hardness of 40 Rockwell C. However, the work engaging portion could be other shapes (for example, a square-tipped shovel blade), sizes, and hardnesses.

Preferably, the work engaging portion includes a curved portion to aid in the penetration or carrying of the soil. For example, the entire work engaging portion can be curved, such as in the typical round-tipped shovel, or the edges of the work engaging portion can be curved, such as in the typical square-tipped shovel.

The implement can include a socket 30 having a receiving portion 35 for receiving a handle. The socket 30 is connected to the work engaging portion 20, and the angle between the carrying surface 25 of the work engaging portion 20 and the centerline of the receiving portion 35 is greater than 10° (the carrying surface being the initial side and the centerline being the terminal side) to allow room for flex of a loaded handle during use. Preferably, the angle is approximately 33° to 39°, and most preferably approximately 36°. In the preferred embodiment, the socket 30 is integral with the sheet metal blade and formed by pressing edges of the blade rearwardly and bringing them together in a manner known to those skilled in the art. Preferably, the receiving portion has a length of four inches, a substantially cylindrical shape with a constant inner diameter of one and one quarter inches, and a hardness of forty Rockwell C. However, a socket having a different length, shape (such as conical or tapered), inner diameter, and hardness could be used when practicing the present invention.

As embodied herein, the implement includes a handle 40 having a gripping portion 45 where the user can grip handle 40. The angle between the carrying surface 25 of the work engaging portion 20 and the centerline of the gripping portion 45 is at least 10° (the carrying surface being the initial side and the centerline being the terminal side) to allow room for flex of a loaded handle during use. Preferable the angle is 33° to 39°, and most preferably approximately 36°.

In the preferred embodiment, the handle 40 is a substantially straight, hollow cylinder having a length of at least thirty inches and preferably thirty eight to forty two inches, a constant outer diameter of one and one quarter inches, a wall thickness of approximately seventy thousandths (0.070) to two hundred fifty thousandths (0.250) of an inch, and is secured in receiving portion 35 of socket 30 by a rivet 60 located three eighths of an inch from the end of the receiving portion 35. Preferably, an eight inch wooden or fiberglass rod is fastened, such as by gluing, into the end of the handle 40 positioned in the socket 30. An additional loose wood filler is preferably placed in the socket near the end of the handle during the assembly process. The handle 40 preferably is made of resin reinforced with fiberglass by pultrusion techniques known to those skilled in the art. However, the handle 40 can be wood (typically forty inches long with a conical or tapered end) or any other known handle material.

As embodied herein, the implement includes at least one step 50 that extends rearwardly or forwardly, or both, from the work engaging portion 20. The step 50 provides a substantially flat, foot engaging surface 55, which the user engages with his or her foot to cause the work engaging portion 20 to penetrate soil. Preferably, the step 50 is integral with the sheet metal blade and formed to extend forwardly.

In the present invention, the foot engaging surface 55 is designed to be aligned with the user's foot when it is in its natural orientation, thereby decreasing discomfort and slippage. The position of the user's foot typically depends on the position of his or her hands, i.e., the centerline of the gripping portion 45 of the handle is typically normal to a plane defined by the bottom of the user's foot when it is in its natural orientation. Thus, to maximize contact with the user's foot, the centerline of the gripping portion 45 is positioned substantially normal, i.e., no more than approximately a 5° deviation, to the plane defined by the foot engaging surface 55 of the step 50. Closer to normal is preferred over farther from normal because it improves the comfort to the user and contact with the user's foot.

Figure 4:
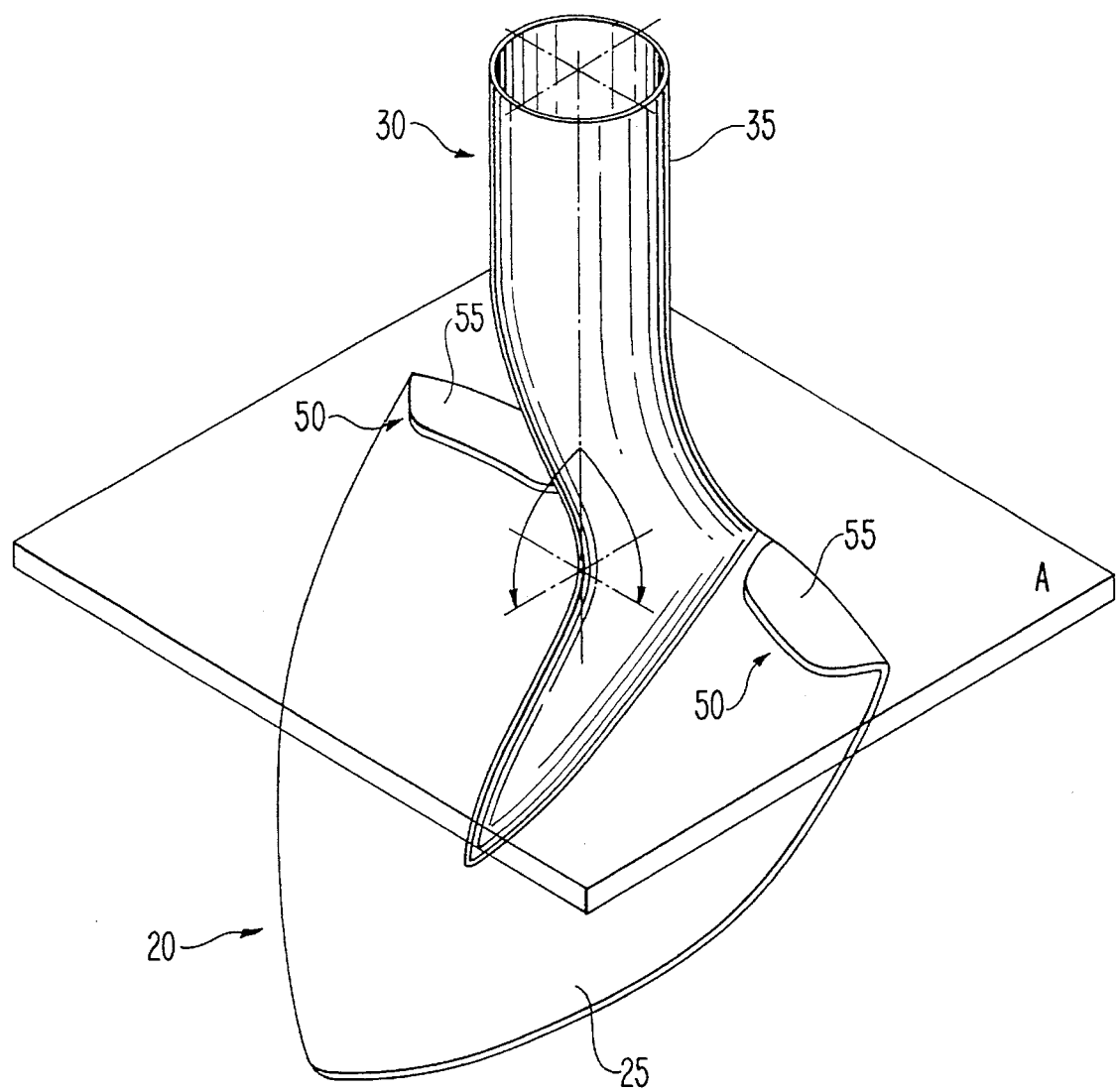
FIG. 4 is a perspective view of the implement of FIG. 1.

FIGS. 2 and 4 show the preferred embodiment of the invention, in which the foot engaging surfaces 55 of two steps 50 both lie in substantially the same plane A, i.e., no more than approximately a 2° deviation. The centerline of the gripping portion 45 is substantially normal to the plane A.

Figure 5:
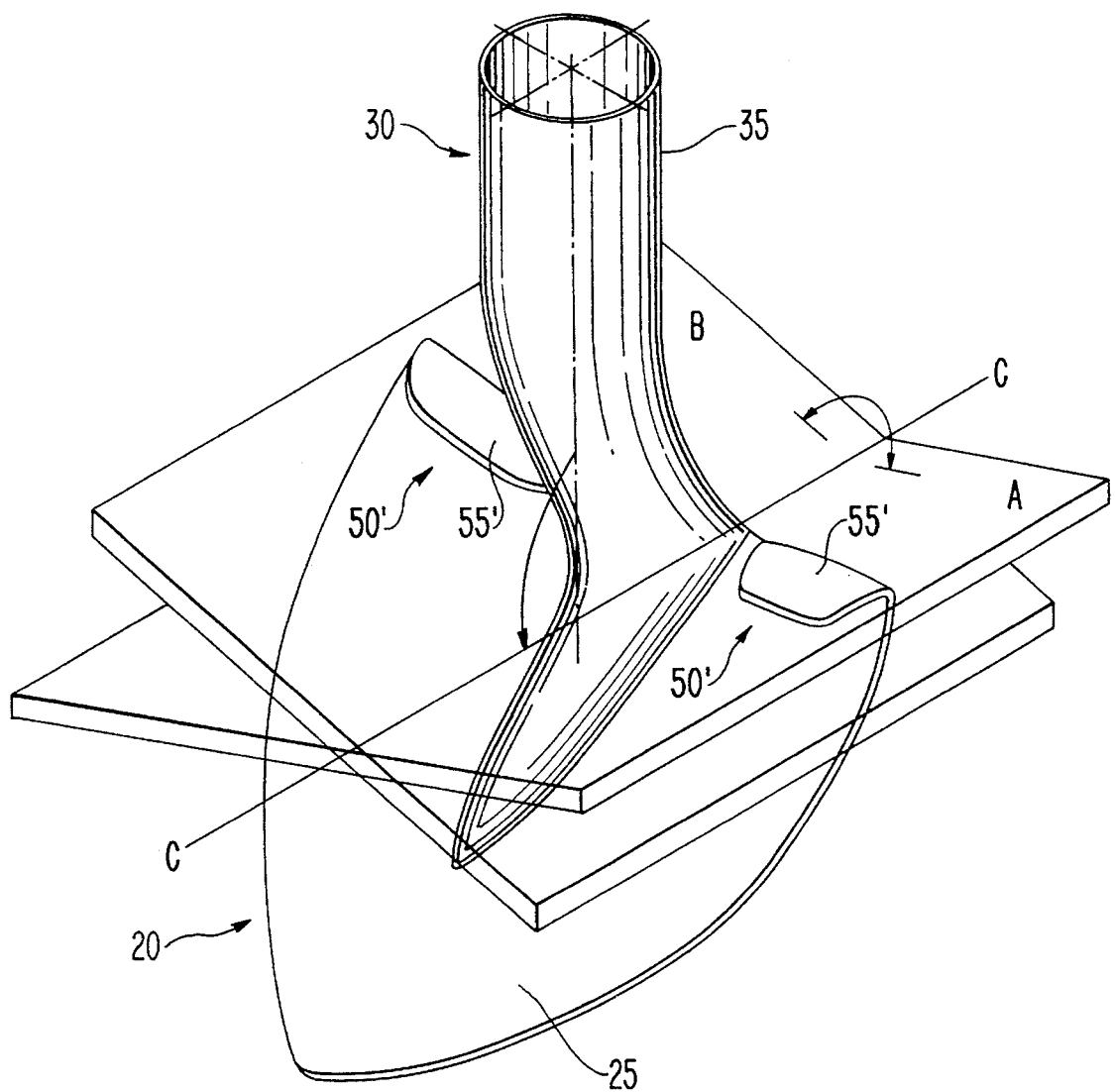
FIG. 5 is a perspective view of the implement of FIG. 3.
Figure 6:
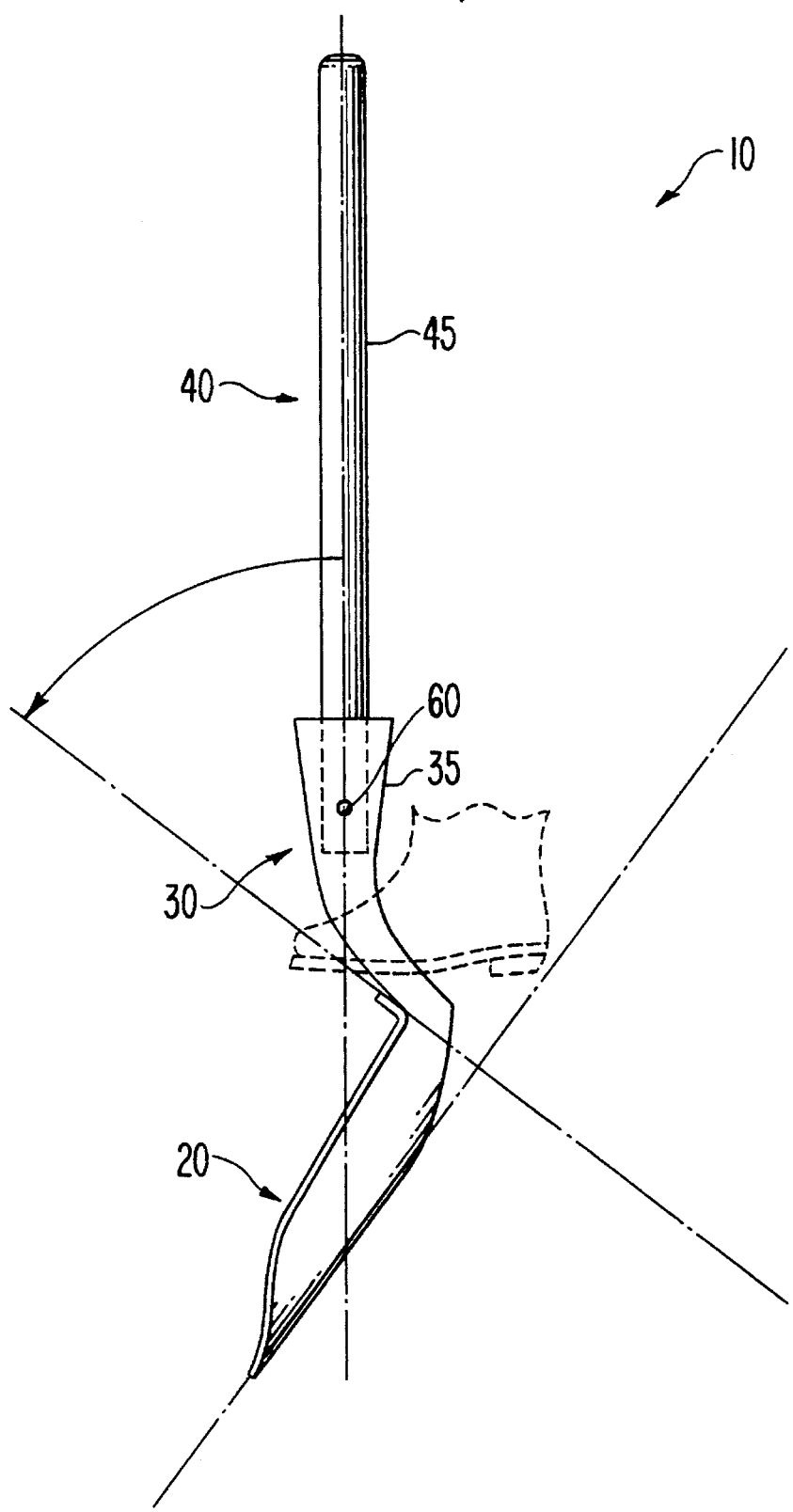
FIG. 6 is a side view of a prior art shovel.

In another embodiment of the invention shown in FIGS. 3 and 5, the foot engaging surfaces 55' of steps 50' lie in two different planes A and B. For example, an angle of approximately 177° to 183° can exist between the two planes A and B. The advantage of the invention can still be obtained by providing a handle 40 having its centerline substantially perpendicular, i.e., no more than approximately a 5° deviation, to a line C—C formed by the intersection of the two planes. Closer to perpendicular is preferred over farther from perpendicular.

In an implement having a straight handle 40, the gripping portion 45 will share a common centerline with the receiving portion 35 of the socket 30. Thus, the above described relationship between the centerline of the gripping portion 45 and the foot engaging surface 55 can apply equally to the relationship between the centerline of the receiving portion 35 and the foot engaging surface 55.

A preferred method for making the work engaging portion and socket of the implement includes placing sheet metal (C-1030 steel) in a furnace operating at approximately 1600° F., forming the sheet metal in presses quickly enough to maintain the work engaging portion and socket at approximately 1500° F., and orienting it relative to the surface of the quenching medium such that the centerline of the receiving portion is substantially normal to the surface of the quenching medium, and maintaining this orientation while inserting the socket and then the work engaging portion into the quenching medium at ninety feet per minute. The preferred quenching medium is water chilled to approximately 50° to 70° F.

It will be apparent to those skilled in the art that various modifications and variations can be made in the implement of the present invention and in construction of this implement without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An implement comprising:
    a handle having a gripping portion and a centerline extending through the gripping portion;
    a work engaging portion;
    a first step having a substantially flat, foot engaging surface lying in a first plane;
    a second step having a substantially flat, foot engaging surface lying in a second plane, the first and second planes defining a line of intersection where the first and second planes cross, said line of intersection being below the first and second foot engaging surfaces;
    wherein the centerline of the gripping portion is substantially perpendicular to the line of intersection formed by the first and second planes and the line of intersection formed by the first and second planes forms an acute angle with the work engaging portion.

2. The implement of claim 1, wherein the work engaging portion is curved.

3. The implement of claim 1, wherein the work engaging portion includes a carrying surface and an angle between the carrying surface and the centerline of the gripping portion is greater than 10°.

4. The implement of claim 1, wherein the implement is a shovel and the work engaging portion is a shovel blade.

5. The implement of claim 1, wherein the steps are integral with the work engaging portion.

6. The implement of claim 1, wherein the steps extend forwardly from the work engaging portion.

7. An implement comprising:

a work engaging portion;

a socket having a receiving portion and a centerline extending through the receiving portion;

a first step having a substantially flat, foot engaging surface lying in a first plane;

a second step having a substantially flat, foot engaging surface lying in a second plane, the first and second planes defining a line of intersection where the first and second planes cross, said line of intersection being below the first and second foot engaging surfaces;

wherein the centerline of the receiving portion is substantially perpendicular to the line of intersection formed by the first and second planes and the line of intersection formed by the first and second planes forms an acute angle with the work engaging portion.

8. The implement of claim 7, wherein the work engaging portion is curved.

9. The implement of claim 7, wherein the work engaging portion includes a carrying surface and an angle between the carrying surface and the centerline of the receiving portion is greater than 10°.

10. The implement of claim 7, wherein the implement is a shovel and the work engaging portion is a shovel blade.

11. The implement of claim 7, wherein the steps are integral with the work engaging portion.

12. The implement of claim 7, wherein the step extends forwardly from the work engaging portion.

* * * * *